(12) United States Patent
Sane et al.

(10) Patent No.: US 7,034,307 B2
(45) Date of Patent: Apr. 25, 2006

(54) NEUTRON DETECTOR EMPLOYING DOPED PYROLYTIC BORON NITRIDE AND METHOD OF MAKING THEREOF

(75) Inventors: Ajit Yeshwant Sane, Medina, OH (US); Jon Russsell Leist, North Olmsted, OH (US); Arthur William Moore, Strongsville, OH (US)

(73) Assignee: General Electric Company, Pittsfield, MA (US)

( * ) Notice: Subject to any disclaimer, the term of this patent is extended or adjusted under 35 U.S.C. 154(b) by 137 days.

(21) Appl. No.: 10/670,903

(22) Filed: Sep. 25, 2003

(65) Prior Publication Data

US 2005/0067575 A1  Mar. 31, 2005

(51) Int. Cl.
*G01T 3/00* (2006.01)
(52) U.S. Cl. .............. 250/370.05; 250/390.01
(58) Field of Classification Search ........... 250/370.05, 250/390.01, 390.02; 438/183; 376/154, 376/159
See application file for complete search history.

(56) References Cited

U.S. PATENT DOCUMENTS

| | | | |
|---|---|---|---|
| 3,152,006 A | 10/1964 | Basche | 117/106 |
| 3,182,006 A | 5/1965 | Fruhwirth et al. | 202/42 |
| 5,334,840 A | 8/1994 | Newacheck et al. | 250/390 |
| 5,399,863 A | 3/1995 | Carron et al. | 250/370 |
| 5,536,360 A | 7/1996 | Nguyen et al. | 216/96 |
| 5,693,581 A | 12/1997 | Honma et al. | 501/96 |
| 5,852,301 A | 12/1998 | Niimura et al. | 250/583 |
| 6,134,289 A | 10/2000 | Peurrung et al. | 376/153 |
| 6,388,260 B1 | 5/2002 | Doty et al. | 250/390 |
| 6,624,423 B1 | 9/2003 | Leist et al. | 250/370.05 |
| 6,727,504 B1 * | 4/2004 | Doty | 250/390.01 |
| 2002/0182394 A1 | 12/2002 | Sane et al. | 428/216 |

FOREIGN PATENT DOCUMENTS

EP  1329741  7/2003

* cited by examiner

*Primary Examiner*—Otilia Gabor

(57) ABSTRACT

A system for measuring a thermal neutron emission from a neutron source is provided. The system employs a detector utilizing a plurality of doped pBN layers, wherein the doped pBN layers are doped with at least one dopant across an a-b plane of the layers for an electrical resistivity of $10^{14}$ ohm-cm or less.

23 Claims, 4 Drawing Sheets

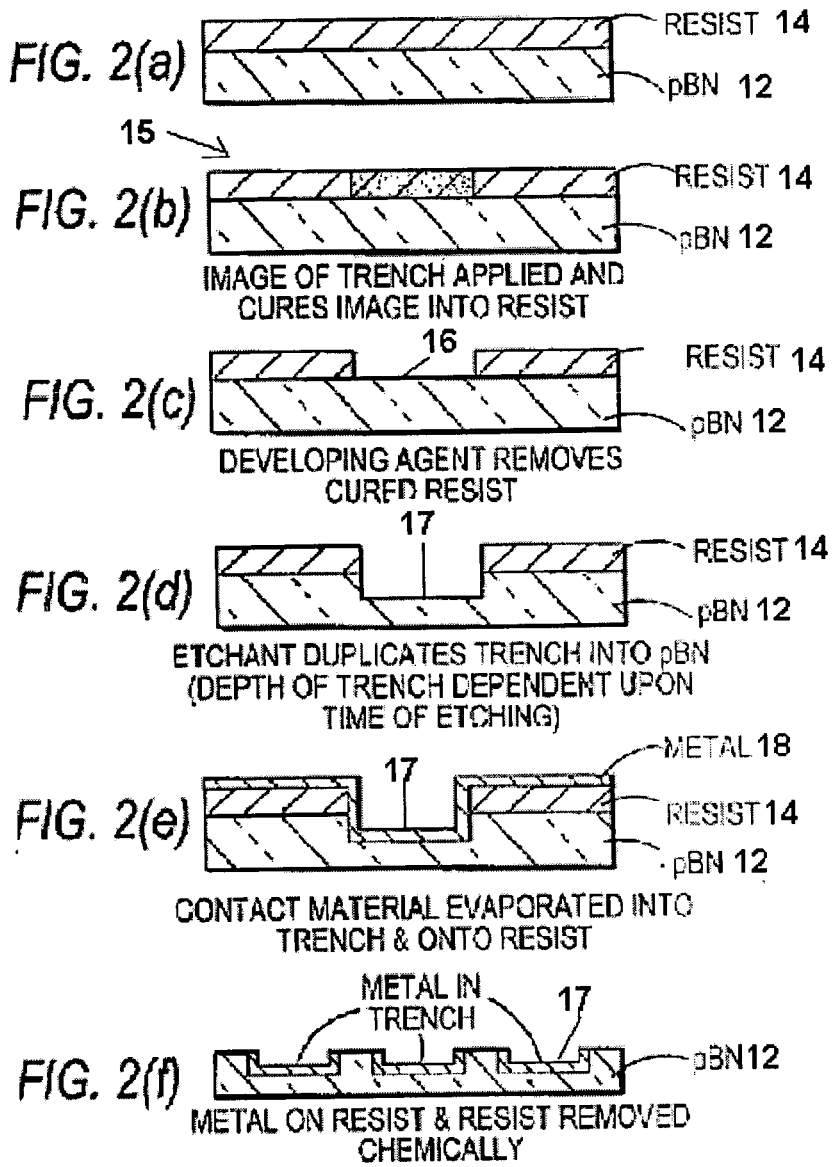
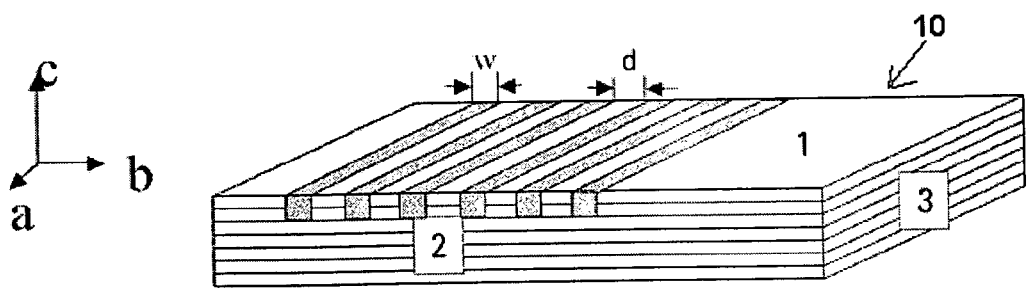
FIG. 2(g)

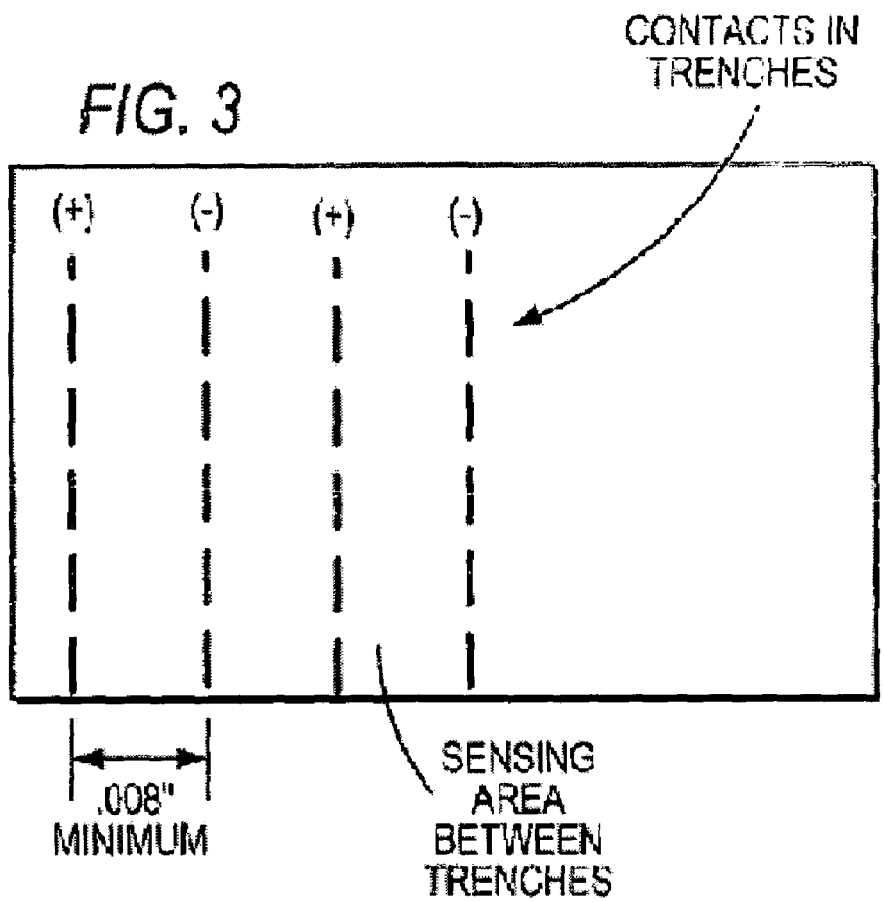
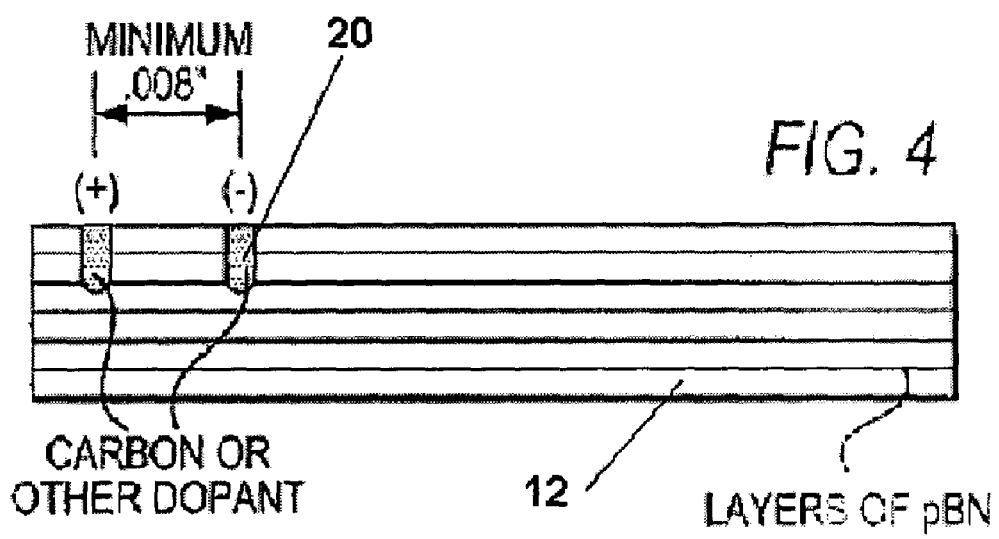

NEUTRON DETECTOR EMPLOYING DOPED PYROLYTIC BORON NITRIDE AND METHOD OF MAKING THEREOF

CROSS-REFERENCE TO RELATED APPLICATIONS NONE

FIELD OF THE INVENTION

This invention relates to a neutron detector, and more particularly to a solid state semiconductor neutron detector formed from pyrolytic boron nitride, and to a method of manufacture of a pyrolytic boron nitride neutron detector.

BACKGROUND OF THE INVENTION

Neutrons are uncharged elemental particles which do not ionize matter as they pass through it. Accordingly, the presence of neutron particles is difficult to detect. Thermal neutrons are produced by splitting atoms such as Uranium 235 in a nuclear reactor and slowing the velocity of the fissioned neutrons through collisions with some moderating material. Neutron detection in the prior art is typically performed with either gas detectors or scintillators. A Geiger counter is a conventional gas detector for detecting neutrons. The Geiger counter is a gas filled tube which may be filled with $^3$He or with $BF_3$, but has limited utility since it is both bulky and expensive to manufacture. Moreover, the Geiger counter requires repeated calibration.

In scintillation detection, the interaction of neutrons with the detector scintillation material occurs within the material, while the detection occurs separately or at a distance by some other detection technique. Scintillator detection devices are based on the principle of scintillation, which is an indirect process in which the interaction of neutrons with a detector scintillation material generates light which, in turn, permits light detectors to be used from which the level of neutron presence can be established. However, the light detectors need to be sensitive to the wavelength of the light. Otherwise, an emulsion film must be used. Because optics cannot gather all of the light and some of the light is reabsorbed by the scintillating material, thus the use of scintillation detectors for detecting neutrons is inefficient. Furthermore, light detectors have an inherent sensitivity limit to all wavelengths.

A promising method to detect neutron has recently emerged, i.e., semiconductor (solid state) detection. This detection method employs a semiconductor that is neutron sensitive, and in particular, thermal neutron sensitive, with the detection and interaction (of neutrons and the detector material) both occurring within the neutron-sensitive material. One material under consideration is pyrolytic boron nitride (or "pBN").

Pyrolytic boron nitride is known in the art, e.g., as formed by chemical vapor deposition using a process described in U.S. Pat. No. 3,182,006, the disclosure of which is herein incorporated by reference, involving introducing vapors of ammonia and a gaseous boron halide such as boron trichloride ($BCl_3$) in a suitable ratio into a heated furnace reactor to deposit boron nitride on the surface of an appropriate substrate such as graphite. The boron nitride is deposited in layers and when separated from the substrate forms a free standing structure of pBN.

Pyrolytic boron nitride ("pBN") is anisotropic and has a hexagonal crystal lattice. Most boron nitride made by chemical vapor deposition (CVD) is composed of hexagonal crytallites in which the a- and b-axes are predominantly oriented parallel to the deposition surface. The hexagonal structure and preferred orientation impart highly anisotropic properties to the pBN. Because of symmetry, the a- and b-axes are equivalent, so it is convenient to describe pBN as having only two sets of properties, i.e., in the ab direction and in the c direction. In a single crystal of BN, the 'a or b planes' are perpendicular to the layers. In pBN, the 'a or b planes' have no preferred orientation except in the direction normal to the deposition layers. The crystographic planes, such as the c plane, are normal to their axes, so that the c plane in pBN is predominantly parallel to the deposition layers. Since the pBN deposits are for practical purposes limited to a few mm thick, the edge surface area is small in comparison with that attainable on the deposition surface.

pBN typically contains roughly about 10 atomic % boron-10 ($^{10}$B) isotope (or about 8.5% by weight) which has a large cross-section for thermal neutrons, allowing pBN to be used in a solid state thermal neutron detector, in which a direct electrical signal is formed proportional to the alpha particles generated from the interaction of the colliding neutrons with the boron-10 isotope in pBN. Attempts have been made in the semiconductor detector prior art to capture neutrons using a pBN detector fabricated in a conventional fashion, and oriented to collect neutrons through the deposition layers, i.e., the predominantly c-axis direction, but have yielded poor results.

In U.S. Pat. No. 6,624,423, Applicants have surprisingly found that the electrical resistivity of pBN, in undoped form, is highly anisotropic and its value in a direction parallel to the plane is lower than its value in the perpendicular direction. Hence, by applying electrodes in the direction normal to the a-b plane (parallel to the "c" direction), a neutron detector can be constructed having a significantly increased sensitivity to thermal neutrons. As illustrated in FIG. 1(a), electrical contacts are applied to the opposing edge surfaces 12 of the pBN structure 10. FIG. 1(b) is an illustration as this prior art reference with a transverse strip or slice of pBN having a thickness "t" being cut from a plate of pBN. Contacts are then applied on the opposing face of the pBN cut, i.e., on the plane 2 and on the opposing face of plane 2 created by the cut. FIG. 1(c) is another illustration of this prior art reference with a transverse strip or slice of pBN being cut from the pBN plate. Contacts are then applied onto plane 3 and the opposing face of plane 3 as created by the cut, with the first contact being a thickness "t" away from the second contact.

In the present invention, Applicants have discovered that although the electrical resistivity of pBN in the perpendicular direction (parallel to the "c" direction) is higher than the direction parallel to the plane for neutron detectors employing pBN, the value can be reduced by doping the pBN with one of C, Si, or Ge and optionally with other dopants including oxygen. Thus, in these neutron detectors, electrodes can still be applied in the direction normal to the "c" direction (parallel to the c plane), facilitating the construction of neutron detectors. As shown in FIG. 1a, doped pBN of the present invention allows electrical contacts to be applied to the two opposing surfaces 11 of the structure 10. The neutron detector of the present invention retains all the advantages of a compact solid state detector that responds strictly to neutrons and is not affected by gamma rays.

SUMMARY OF THE INVENTION

The invention relates to a thermal neutron detector comprising a pBN layer having a thickness of between 1–1000 microns between the opposed edge surfaces, at least one metalized contact on each of said opposed surfaces to detect the presence of neutrons striking one of the two opposed surfaces, and wherein the pBN layer is doped with an elemental dopant selected from the group of carbon, silicon, titanium, aluminum, gallium, germanium, or combinations thereof, for an electrical resistivity of less than about $10^{14}$ ohm-cm.

The present invention relates to a solid state neutron detector of pBN, in which a direct electrical signal is generated from alpha particles produced in response to the interaction of neutrons with the pBN detector material, by a) applying electrical contacts between two opposite surfaces of a pBN layer doped with an elemental dopant selected from the group of carbon, silicon, titanium, aluminum, gallium, germanium, or combinations thereof, for an electrical resistivity of less than about $10^{14}$ ohm-cm; and b) by connecting the electrical contacts to an electrical analyzer.

The invention further relates to a pBN neutron detector, which comprises a pBN layer doped with an elemental dopant selected from the group of carbon, silicon, titanium, aluminum, gallium, germanium, or combinations thereof, for an electrical resistivity of less than about $10^{14}$ ohm-cm, metalized contacts contacting opposing surfaces of the doped pBN layer for conducting electrons to detect neutrons and with the structure having a thickness between the opposed edge surfaces of between one micron and one mm. In one embodiment, the metalized contacts are layered strips parallel to one another and separated by a distance of between 25 and 100 microns.

The invention also relates to a method of forming a neutron detector, which method comprises the steps of: a) forming pBN layer doped with an elemental dopant selected from the group of carbon, silicon, titanium, aluminum, gallium, germanium, or combinations thereof, for an electrical resistivity of less than about $10^{14}$ ohm-cm; c) applying metalized contacts to two opposite sides of the doped pBN layer; and d) orienting a detector relative to a source of neutrons for the neutrons to enter the detector and interact with the $^{10}$B, thus generating alpha particles and gamma rays, raising the energy level and releasing electrons to conduct through the doped pBN layer parallel to the c plane.

BRIEF DESCRIPTION OF THE OF THE DRAWINGS

FIG. 1(a) is a view in perspective of a layered hexagonal pBN structure showing the a, b and c directions of the hexagonal lattice.

FIGS. 1(b)–1(c) are perspective views showing embodiments of the prior art, for forming and applying contacts onto the pBN neutron detector.

FIGS. 2(a)–2(f) show the stage progression using lithography to form an array of contacts on the pBN neutron detector of the present invention;

FIG. 2(g) is a perspective view showing an array of contact on the pBN neutron detector.

FIG. 3 is a top view of the finished array of contacts formed on the pBN neutron detector using the steps in FIGS. 2(a)–2(f);

FIG. 4 is a cross sectional side view of a pBN plate showing a pattern of contacts formed in the pBN neutron detector structure by ion implantation.

DETAILED DESCRIPTION OF THE INVENTION

Figure 1A:
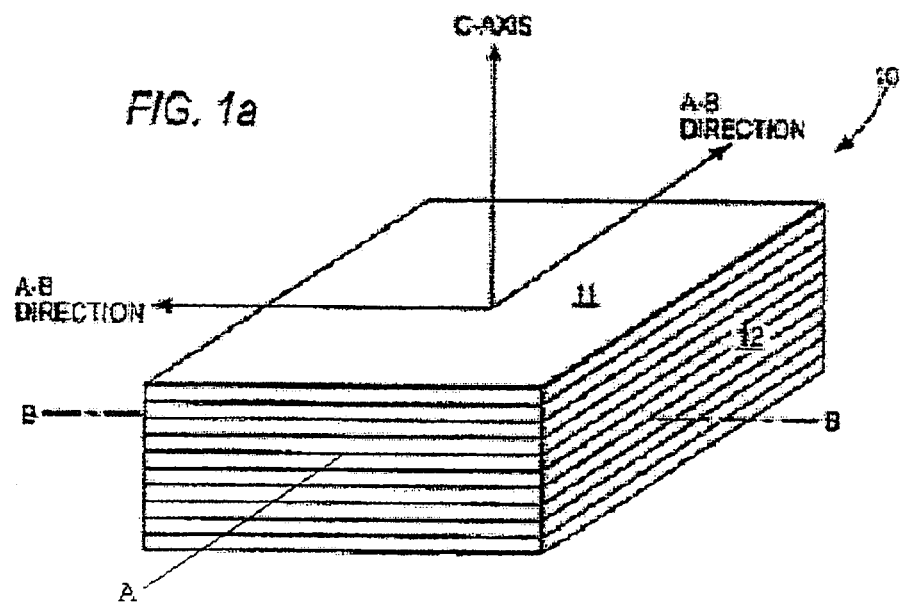

The invention relates to thermal neutron detection systems employing pBN. In the present invention, the electrical resistivity of pBN in a direction normal to the a-b plane is reduced by doping pBN with one of carbon, silicon, titanium, aluminum, gallium, germanium, or combinations thereof, and optionally with other dopants including oxygen, thus allowing electrical contacts to be applied to the two opposing surfaces 11 of the plate perpendicular to the A—A plane in FIG. 1 and facilitating the construction of the neutron detectors.

In the Figure, plate 10 is oriented relative to a conventional neutron source (not shown) such that neutrons will travel parallel to the c-direction and strike the surface layers.

Doping the pBN structure: Undoped pBN or pyrolytic boron nitride can be produced by a vapor phase reaction between a boron halide, e.g., boron trichloride, and ammonia as taught in U.S. Pat. No. 3,152,006, the disclosure of which is herein incorporated by reference.

In yet another embodiment, the pBN or pyrolytic boron nitride is produced by a vapor phase reaction between a $^{10}$B-enriched boron halide, e.g., boron trichloride or boron trifluoride, and ammonia, for a material with a high concentration of $^{10}$B interaction sites of at least 12 atomic % $^{10}$B, and thus increasing the detection efficiency of the pBN material. In another embodiment of the invention, the pBN comprises at least 15 atomic % $^{10}$B. In yet a third embodiment, the pBN comprises at least about 20 atomic % $^{10}$B.

In the present invention, pBN is doped with at least one elemental dopant selected from the group of carbon, silicon, titanium, aluminum, gallium, germanium, or combinations thereof.

In one embodiment of the invention, the dopant is carbon. In another embodiment of the invention, additional dopants such as oxygen are included in the pBN layers.

In one embodiment, the pBN is doped with carbon in a process as disclosed in U.S. Pat. No. 5,693,581, the disclosure of which is herein incorporated by reference. In this process, a feed gas of gaseous boron halide and ammonia is introduced into a furnace heated to about 1600–2200° C. with the furnace containing a substrate of graphite to form a deposit of pyrolytic boron nitride (pBN) on the substrate, and simultaneously introducing a hydrocarbon gas, e.g., $CH_4$, into the furnace to form a co-deposit of carbon in the crystal structure of the pBN deposit, with the hydrocarbon gas concentration being carefully controlled to keep the concentration of the dopant carbon to a desired level.

In another embodiment of the invention employing a process similar to the process taught in U.S. Pat. No. 5,693,581, a $SiH_4$ gaseous feed is used instead for a silicon-doped pBN structure. In yet another embodiment, $GeH_4$ gaseous feed is used instead for a germanium doped pBN.

In yet another embodiment of the doping process the feed boron halide gas is $^{10}$B-enriched, for the pBN to have a high concentration of $^{10}$B interaction sites of at least 12 atomic % $^{10}$B.

In another embodiment, "secondary" dopants are introduced by injection of such materials as $O_2$, $N_2$, air, CO, $CO_2$, or any suitable mixtures of O containing species such as water. With respect to carbon as a secondary dopant, a gaseous feed containing carbon such as ethane, propane, methanol, and ethanol may be introduced. The choice of dopant and its concentration relative to $BCl_3$ is determined by processing conditions and applications.

In one embodiment of the invention, the dopant concentration is maintained at a level of about 3.5 atomic %. In yet another embodiment wherein C is the dopant, the carbon concentration in the pBN composite is maintained at a level of less than 4 wt. %. In a second embodiment, the carbon dopant level is maintained at a level of about less than 3 wt. % for an electrical resistivity of about $10^{14}$ Ω-cm or less.

In another embodiment, the pBN is doped with a dopant in a process as taught by U.S. Patent Publication No. 20020182394A, the disclosure of which is herein incorporated by reference. In this process, one or more dopant gases are introduced as pulses at selected intervals so that the selected dopant(s) will be incorporated into the PBN at selected layers spaced a predetermined distance apart.

Figure 1B:
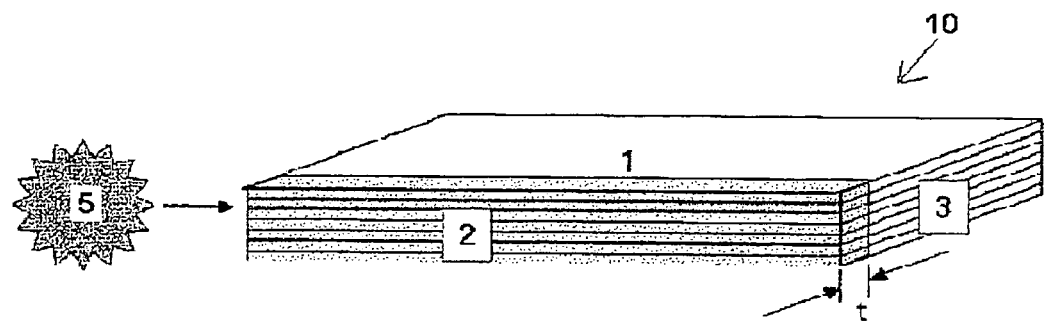
Figure 1C:
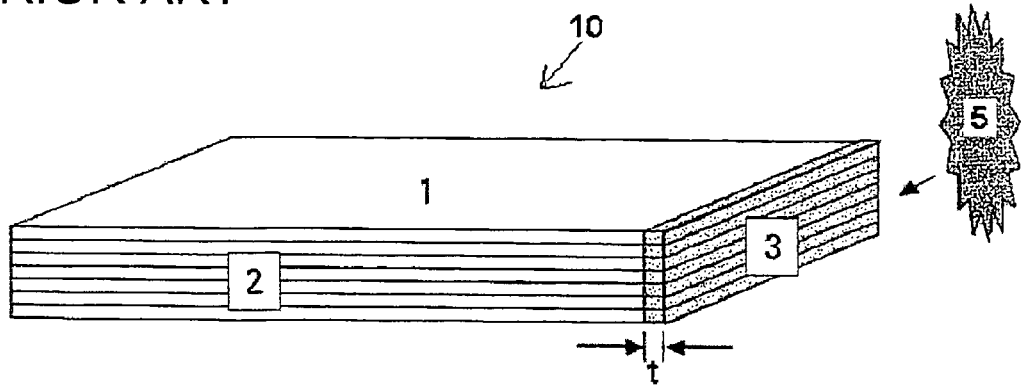

As shown in FIG. 1(a), the doped pyrolytic boron nitride ("PBN") material may be configured into a shape such as that of a rectangular plate 10, with the pBN having a hexagonal crystalline lattice structure grown in layers corresponding to the c axis-direction shown.

In one embodiment of the invention, the doped pBN material has a thickness of about 1 to 1000 microns. In a second embodiment of the invention, the doped pBN has a thickness of about 5 to 500 microns. In a third embodiment of the invention, the doped pBN has a thickness of less than 100 microns. In a fourth embodiment, the doped pBN has a thickness of more than 5 microns.

Forming Electrical Contacts. After the doping process, electrodes are applied to the surface of the plate as illustrated in FIG. 2(g) such that the electrodes are substantially parallel to crystallographic planes a-b. In one example, the spacing 'd' between the electrical connections is kept in the range of about 1 micron to 1 mm to maintain a good electrical connection. Electrodes may be formed via processes/techniques known in the art including but not limited to conventional lithography, photomasking, ion implantation, gold sputtering, electroplating, and the like.

In one embodiment to form the electrical contacts, the first few layers of the pBN plate 10 is machined off and then back-filled with electrical connections.

In yet another embodiment of the invention to fabricate the pBN neutron detector using conventional lithography techniques as is illustrated in FIGS. 2(a)–2(f) for a large array of detectors to be formed. In this method, a photosensitive resist layer 14 is applied to a surface of the pBN strip or plate. A pattern is machined in a conventional mask (not shown), and a light source is placed behind the mask to create an image on the strip surface where the light gets through the mask, thus forming a cured image in the resist layer 14. Via this technique, a multiple number of cured images may be formed in one resist layer forming a pattern having any desired number of parallel cured images in the resist layer on the pBN material. FIG. 2(b) shows one exemplary cured image 15 in the resist layer 14.

In the next step as shown in FIG. 2(c), a developing agent is applied to the resist layer to remove the cured resist from the resist layer 14 to form a channel 16. A conventional etchant is then applied in the channel 16 to form a trench 17 in the pBN strip 12, which is directly below the channel 16 as is shown in FIG. 2(d). In one embodiment, the width of the trench 17 corresponds to the width of the channel 16 in the resist layer 14, whereas the depth of the trench 17 is a variable determined by the duration of the application of etchant. Methods for etching boron nitride are known in the art, i.e., is as disclosed in U.S. Pat. No. 5,536,360. Examples of etchants include phosphoric acid, hydrofluoric acid, and buffered hydrofluoric acid.

A metal material is then evaporated over the resist layer 14 and over the trench 17 to form a coated layer of metal 18. The metal coating 18 and the resist material 14 underneath the coating 18 is chemically removed except in the area of the trench 17, so that the trench 17 and the coating of metal 18 above the trench 17 remains as is shown in FIG. 2(e). This leaves the pBN strip 12 with one or more trenches 17 in which each trench 17 is covered with a metal coating 18 as is shown in FIG. 2(f), forming an array of metalized contact points. In one embodiment, the trenches 17 are separated from one another by a distance of between about 25 and 100 microns. In another embodiment, the separation is about 25 to about 50 microns.

In yet another embodiment (not shown), the electrical connections are in the form of plurality of raised dots and pads as known in the art.

FIG. 3 shows the top view of the array in FIG. 2(f) or FIG. 1(e). The array of metalized contact points are electrically connected to electrical conductors which, in turn, may be connected to a conventional multi-channel analyzer as shown in FIG. 4, measuring the electron flow corresponding to the number of alpha particles formed when neutrons interact with the pBN material on the array surface.

The electrical contacts in yet another embodiment of the invention are formed by photomasking and ion implantation techniques known in the art. In an example illustrated by FIG. 4, a multiple array of metalized contact points are formed in the pBN material in an ion implantation process, in which a dopant material is implanted into the pBN material to form a contact pattern equivalent to the pattern formed by lithography as explained above in connection with FIGS. 2(a)–2(f). In one embodiment, the dopant is concentrated in channels 20, which channels are aligned parallel to one another. Since the resistivity of the channels 20 are in proportion to the concentration of dopant for a given dopant material, the concentration of the dopant is selected for a desired resistivity of the channel 20.

Figure 5:
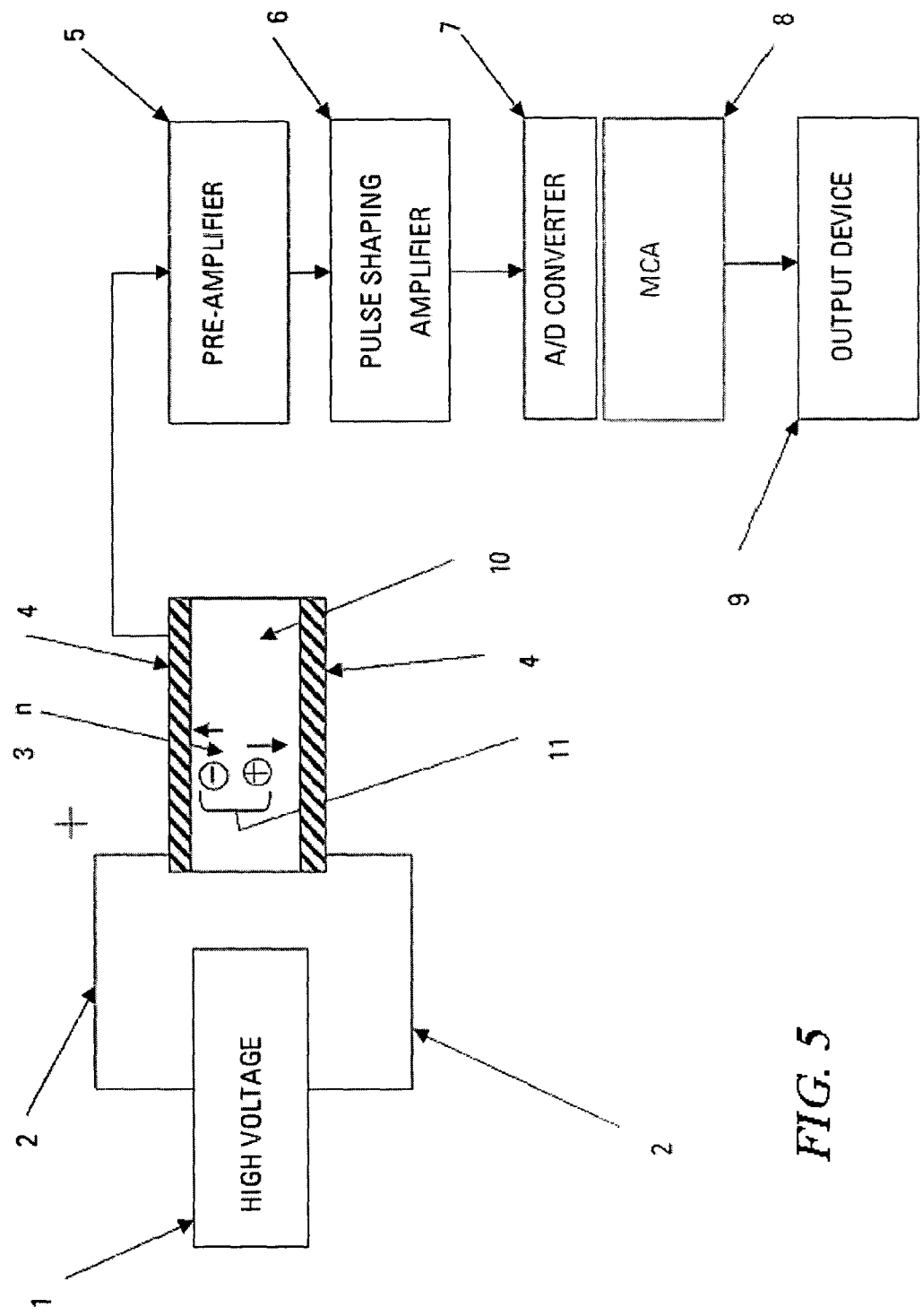
FIG. 5 is a schematic diagram of a neutron detector system using the pBN neutron detector of the present invention.

System Employing Doped pBN Neutron Detector of the Invention. FIG. 5 is a block diagram illustrating the schematic of a system employing the neuron detector of the invention and supporting electronics. In the figure, electrodes 4 are plated or deposited onto the opposing surface of the neutron detector 10. Each electrode 4 is attached to an electrical lead 2 connecting the electrode to a source of high voltage 1. The analyzer circuit is completed by a pre-amplifier 5 to convert the charge from the detector into a low impedance voltage signal, followed by a linear pulse-shaping amplifier 6 to amplify and filter the signal. A timing single channel analyzer (TSCA, not shown) may be optionally used to discriminate the pulse height of the signal.

Output pulses from the amplifier 6 are directed to a digitizer 7, and multi-channel analyzer (MCA) 8 which digitizes the pulse height of each of the signal pulses received from the shaping amplifier 6 and then accumulates each of those digital signals in channel numbers corresponding to the magnitude of the digitized signal. The signal spectrum output of MCA 8 consists of one or more broad peaks, corresponding to the energies of the neutron capture reaction, or reactions, presented on oscilloscope display 9, or some other similar output devices.

The neutron detector of the present invention is of sufficiently small size to be used in small-angle neutron scattering (SANS) instruments, for use in the study of materials with micro and nanostructures whose sizes fall in the range of 1 to 100 nm. Furthermore, the neutron detector of the invention in one embodiment demonstrates excellent gamma rejection to function in a gamma background. The detector of the invention is also radiation hard to be able to be continuously exposed to intense direct neutron beams.

In one embodiment of the invention, the alpha particle generated in a boron-10 isotope interaction with a neutron loses about 0.2% of its energy to the electrons with which it interacts, and generally loses all energy (100%) through attenuation in the pBN material within an interaction distance of about 2 microns (0.008 inches). In yet another embodiment, the alpha particle loses up to or more than about 50% of its energy within an interaction distance of up to about 1 micron (0.004 inches). As indicated above, the thickness of the pBN material in one embodiment for good resolution is optimized to be between about one micron and one mm.

EXAMPLES

Examples are provided herein to illustrate the invention but are not intended to limit the scope of the invention.

Example 1

In this first example, pyrolytic boron nitride layers are deposited on a graphite mandrel by passing $BCl_3$, $NH_3$ in a graphite vacuum furnace based CVD reactor. Reactant gases are introduced into a heated chamber (heated to a temperature in the range of 1600°–1900° C.) within a water-cooled steel vacuum chamber. The graphite mandrel is placed above a nozzle through which reactant gases flow into the heated chamber. Water-cooled coaxial injectors are used. Temperature is monitored by an optical pyrometer. Pressure is monitored by a vacuum transducer.

In the deposition process, $CH_4$ is introduced along with $BCl_3$ at feed rates adjusted for the carbon concentration in the pBN to be kept at about 3 wt. % or less (by adjusting the C/B ratio and O/C ratio in the feed gases, specifically the rates of $CH_4$ relative to $BCl_3$).

The electrical resistivity of the doped pBN composite is measured at about $2.1 \times 10^8$ ohm-cm.

Example 2

In example 2, an additional feed stream of an oxygen precursor is introduced to adjust the oxygen concentration in the pBN. The $BCl_3$ feed stream is maintained at about 0.5 slpm. The $NH_3$ is maintained at about 1.5 slpm. The furnace temperature is about 1800° C. Vacuum pressure is maintained at about 0.5 mm Hg. At intervals of about every 15 minutes, a pulse of CO feed rate of about 0.5 slpm is introduced for about 5 seconds to sufficiently incorporate oxygen uniformly along the surface of the pBN material.

The deposition rate is at about 100–180 microns per hour. After the deposition, pBN layers may be obtained by peeling them off the pBN deposit. The ped strength between the pBN layers is measured using a double cantilever beam (DCB) test known in the art to measure peel strength between the surface layer interfaces. The peel strength is found to be about 1.5 N/mm or less.

Example 3

Example 2 is repeated for to produce layers of doped pBN with engineered weaker interfaces at intervals of about every 100 microns. The layers are peeled of by attaching an adhesive tape (3M's Scotch Tape) and pulling the tape in a direction normal to the deposited layer, thus separating the layers.

In the next step, electrodes (silver filled epoxy) are applied to the planar surfaces of each layer. Once the electrodes are attached on either side, a high voltage gradient is generated by applying suitable level of D.C. field. The detector is then attached to a schematic incorporating electronic circuit as shown in FIG. 5 for detection of pulses generated by neutron-boron interaction.

Other modifications, variations, and applications of the present invention may be made in accordance with the above teachings other than as specifically described to practice the invention within the scope of the following claims. All citations referred herein are expressly incorporated herein by reference.

We claim:

1. A detector for thermal neutrons, said detector comprising:
   a layered structure having opposed surfaces and comprising pBN layers between the opposed surfaces, each of said pBN layers having a thickness of between 1–1000 microns;
   at least one metalized contact on each of said opposed surfaces to detect the presence of neutrons striking one of the two opposed surfaces;
   wherein a plurality of said pBN layers are doped with an elemental dopant selected from the group consisting of carbon, silicon, titanium, aluminum, gallium, germanium, and combinations thereof, for an electrical resistivity of less than about $10^{14}$ ohm-cm;
   said elemental dopant being distributed across a c-plane in each of said doped pBN layers.

2. The neutron detector of claim 1, wherein each of said doped pBN layers is doped with oxygen as a second dopant.

3. The neutron detector of claim 1, wherein each opposed surface has a plurality of metalized contacts, wherein the contacts are separated from each other by a distance of between 20 and 100 microns.

4. The neutron detector of claim 1, wherein the thickness between the opposed surfaces is less than about 100 microns.

5. The neutron detector of claim 1, wherein said at least one contact is in the form selected from one of a metalized strip and a raised dot.

6. The neutron detector of claim 1, wherein each of said doped pBN layers is doped with carbon in an amount of less than about 3 wt. %.

7. The neutron detector of claim 1, wherein the pBN in each of said doped pBN layers is produced by a vapor phase reaction process with a $^{10}B$ enriched boron halide feed for said pBN to comprise at least 12 atomic % boron-10 ($^{10}B$) isotope.

8. A system for measuring a thermal neutron emission from a neutron source, said system comprising the neutron detector of claim 7.

9. A system for measuring a thermal neutron emission from a neutron source, said system comprising the neutron detector of claim 1.

10. The neutron detector of claim 1, all of the pBN layers in said layered structure being doped with an elemental dopant selected from the group consisting of carbon, silicon, titanium, aluminum, gallium, germanium, and combinations thereof, for an electrical resistivity of less than about $10^{14}$ ohm-cm.

11. The neutron detector of claim 10, said elemental dopant being distributed across a c-plane in each of the pBN layers in said layered structure.

12. The neutron detector of claim 1, said doped pBN layers having an electrical resistivity on the order of $10^8$ ohm-cm.

13. A method of forming a neutron detector to detect the presence of neutrons, said method comprising the steps of:
   forming a layered structure having opposed surfaces and comprising at least a plurality of layers having an electrical resistivity of less than about $10^{14}$ ohm-cm and a thickness of between 1–1000 microns between the opposed surfaces, said plurality of layers comprising pyrolitic boron nitride (pBN) containing boron-10 ($^{10}$B) isotope and an elemental dopant distributed across a c-plane in said plurality of layers, said elemental dopant being selected from the group consisting of carbon, silicon, titanium, aluminum, gallium, germanium, and combinations thereof; and
   forming electrical contacts on each of said opposed surfaces of said layered structure.

14. The method of claim 13, wherein forming electrical contacts on each of said opposed surfaces comprises the steps of carving channels on each of said opposed surfaces and back-filling said channels with metalized strips.

15. The method of claim 13, wherein forming electrical contacts on each of said opposed surfaces comprises applying metalized contacts to each of said opposed surfaces.

16. The method of claim 13, wherein said electrical contacts are in the form of strips separated from each other a distance of between 20 and 100 microns.

17. The method of claim 13, wherein said electrical contacts are formed by a lithography process comprising the steps of:
   forming a photosensitive resist layer on a surface of a doped pBN layer;
   passing light through a mask onto the photosensitive resist layer with the mask having a desired pattern to create a cured image of the pattern on the photosensitive resist layer where the light gets through the mask;
   removing the cured resist from the resist layer to form channels in the resist layer;
   applying an etchant in said channels to form corresponding trenches in the doped pBN layer below the channels;
   evaporating metal material over the resist layer and over the trenches; and
   chemically removing the evaporated metal material and resist layer material except in the area of the trenches to form an array of metallized contact strips aligned parallel to each other.

18. The method of claim 13, wherein said electrical contacts are formed by ion implantation in which a dopant is implanted in the surface of a pBN layer forming metal contact strips having a controlled resistivity at the implanted surface of the pBN layer.

19. The method of claim 13, wherein said dopant is carbon.

20. The method of claim 19, further comprising the step of orienting the detector relative to a source of neutrons for the neutrons to enter the detector and interact with the $^{10}$B in said doped pBN layer for electrons to be released and conducted through said doped pBN layers.

21. The method of claim 13, wherein said pBN comprises at least 12 atomic % $^{10}$B.

22. A method for measuring a thermal neutron emission from a neutron source, said method comprising:
   a) providing a detector comprising: (i) a layered structure having opposed surfaces and comprising layers having an electrical resistivity of less than about $10^{14}$ ohm-cm and a thickness of between 1–1000 microns between the opposed surfaces, a plurality of said layers comprising pyrolytic boron nitride (pBN) containing boron-10 ($^{10}$B) isotope and an elemental dopant distributed across a c-plane, said elemental dopant being selected from the group consisting of carbon, silicon, titnaium, aluminum, gallium, germanium, and combinations thereof; and (ii) at least one metalized contact on each of said opposed surfaces to detect the presence of neutrons striking one of the two opposed surfaces in a direction essentially perpendicular to the c-axis of the layered structure; and
   b) exposing said detector to thermal neutrons which cause said detector to emit charges, that are subsequently recorded by an output device.

23. The method of claim 22, wherein said pBN comprises at least 12 atomic % $^{10}$B.

* * * * *